United States Patent
Labrot et al.

(10) Patent No.: US 11,878,498 B2
(45) Date of Patent: Jan. 23, 2024

(54) METHOD FOR LAMINATING A LAMINATED PANE COMPRISING A FUNCTIONAL ELEMENT WITH ELECTRICALLY SWITCHABLE OPTICAL PROPERTIES

(71) Applicant: SAINT-GOBAIN GLASS FRANCE, Courbevoie (FR)

(72) Inventors: Michael Labrot, Aachen (DE); Laurent Maillaud, Massy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/007,648

(22) PCT Filed: May 31, 2021

(86) PCT No.: PCT/EP2021/064493
§ 371 (c)(1),
(2) Date: Dec. 1, 2022

(87) PCT Pub. No.: WO2021/249801
PCT Pub. Date: Dec. 16, 2021

(65) Prior Publication Data
US 2023/0226813 A1   Jul. 20, 2023

(30) Foreign Application Priority Data
Jun. 10, 2020   (EP) .................................. 20179209

(51) Int. Cl.
*G02F 1/1333*   (2006.01)
*B32B 38/10*   (2006.01)
(Continued)

(52) U.S. Cl.
CPC .............. *B32B 38/10* (2013.01); *B32B 7/022* (2019.01); *B32B 17/1077* (2013.01);
(Continued)

(58) Field of Classification Search
CPC ................ B32B 38/10; B32B 17/1077; B32B 17/10788; B32B 27/08; B32B 27/30;
(Continued)

(56) References Cited

U.S. PATENT DOCUMENTS 6,055,088 A * 4/2000 Fix ...................... B32B 17/1011
359/275
2002/0171788 A1* 11/2002 Lin ................... B32B 17/10055
349/96
(Continued)

FOREIGN PATENT DOCUMENTS

DE   10 2008 026339 A1   12/2009
EP     0 825 478 A1      2/1998
(Continued)

OTHER PUBLICATIONS

International Search Report as issued in International Patent Application No. PCT/EP2021/064493, dated Jul. 6, 2021.

*Primary Examiner* — James A Dudek
(74) *Attorney, Agent, or Firm* — Pillsbury Winthrop Shaw Pittman LLP

(57) ABSTRACT

A method for producing a laminated pane with a functional element with electrically switchable optical properties, includes creating a first stack of layers including a first pane, a first thermoplastic laminating film, a separating film, a second thermoplastic laminating film, a second pane, laminating the first stack of layers while being heated, taking the first pane with the first thermoplastic laminating film off the second pane with the second thermoplastic laminating film, and the at least one separating film is removed from the stack of layers, providing a functional element having an active layer, placing the functional element into the stack of layers, whereby a second stack of layers is formed, laminating the second stack of layers to form a laminated pane, wherein the (Continued)

Figure 1:
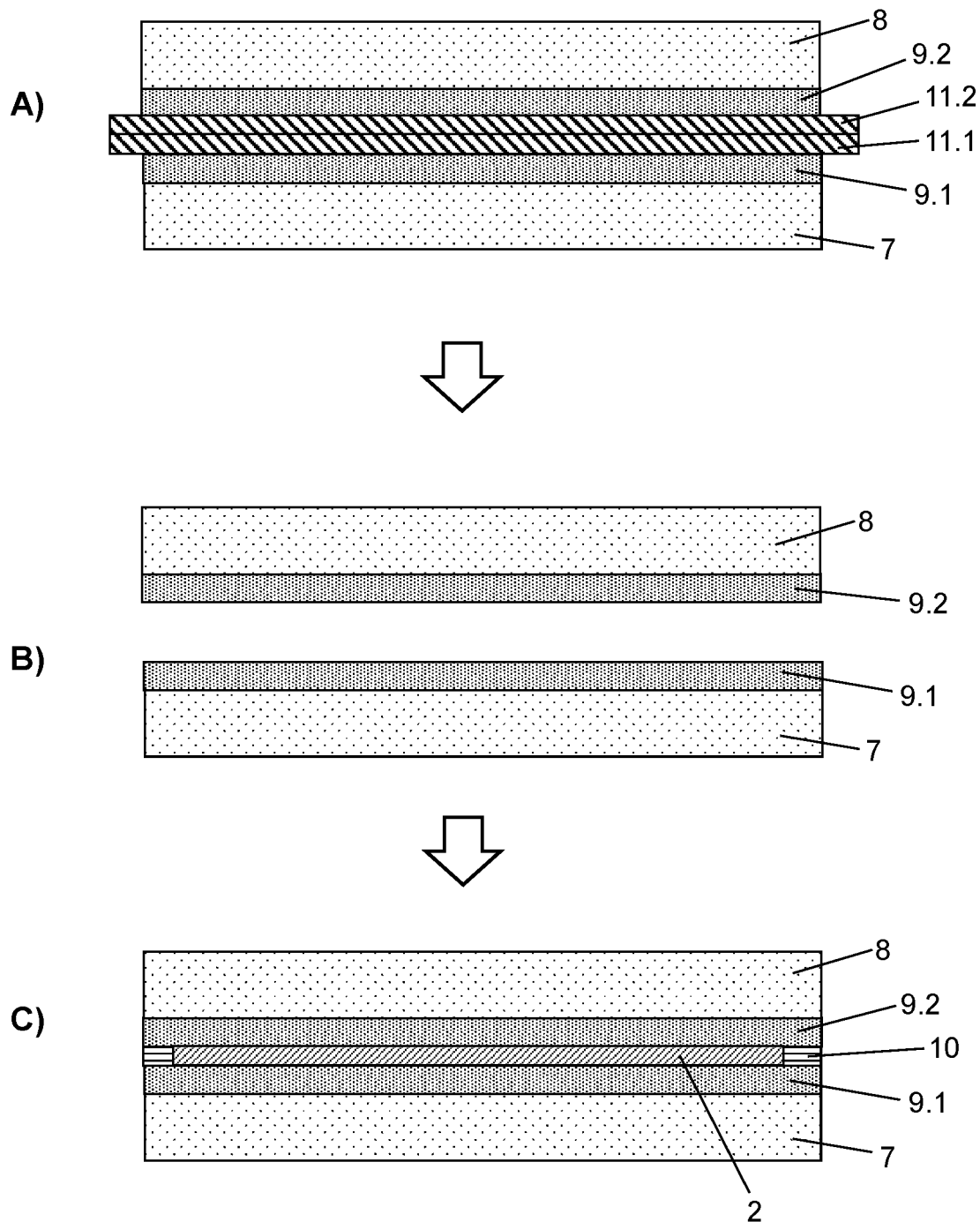

separating film is detachable residue-free from the first thermoplastic laminating film and the second thermoplastic laminating film.

20 Claims, 4 Drawing Sheets

(51) Int. Cl.
| | |
|---|---|
| B32B 7/022 | (2019.01) |
| B32B 17/10 | (2006.01) |
| B32B 27/08 | (2006.01) |
| B32B 27/30 | (2006.01) |
| B32B 27/32 | (2006.01) |
| B32B 27/40 | (2006.01) |
| B32B 37/04 | (2006.01) |
| G02F 1/137 | (2006.01) |
| B32B 27/36 | (2006.01) |

(52) U.S. Cl.
CPC ........ *B32B 17/10788* (2013.01); *B32B 27/08* (2013.01); *B32B 27/30* (2013.01); *B32B 27/306* (2013.01); *B32B 27/325* (2013.01); *B32B 27/40* (2013.01); *B32B 37/04* (2013.01); *G02F 1/13725* (2013.01); *G02F 1/133305* (2013.01); *B32B 27/36* (2013.01); *B32B 2255/10* (2013.01); *B32B 2255/20* (2013.01); *B32B 2255/205* (2013.01); *B32B 2305/55* (2013.01); *B32B 2307/7376* (2023.05); *B32B 2315/08* (2013.01); *B32B 2323/00* (2013.01); *B32B 2329/06* (2013.01); *B32B 2331/04* (2013.01); *B32B 2367/00* (2013.01); *B32B 2375/00* (2013.01); *B32B 2605/00* (2013.01)

(58) Field of Classification Search
CPC ..... B32B 27/306; B32B 27/325; B32B 27/40; B32B 37/04; B32B 27/36; B32B 2305/55; B32B 2307/7376; B32B 2315/08; B32B 2331/04; B32B 2367/00; B32B 2375/00; G02F 1/133305; G02F 1/13725

See application file for complete search history.

(56) References Cited

U.S. PATENT DOCUMENTS

| | | | |
|---|---|---|---|
| 2004/0227462 | A1 | 11/2004 | Utsumi et al. |
| 2010/0165436 | A1* | 7/2010 | Voss .......................... B60J 1/00 |
| | | | 359/238 |
| 2012/0026573 | A1 | 2/2012 | Collins et al. |
| 2020/0139692 | A1* | 5/2020 | Park ..................... B32B 43/006 |
| 2023/0001770 | A1* | 1/2023 | Gima ..................... B32B 23/08 |

FOREIGN PATENT DOCUMENTS

| | | |
|---|---|---|
| EP | 0 964 288 A2 | 12/1999 |
| EP | 0 876 608 B1 | 4/2002 |
| EP | 1 862 849 A1 | 12/2007 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2014/126974 A1 | 8/2014 |

* cited by examiner

METHOD FOR LAMINATING A LAMINATED PANE COMPRISING A FUNCTIONAL ELEMENT WITH ELECTRICALLY SWITCHABLE OPTICAL PROPERTIES

CROSS-REFERENCE TO RELATED APPLICATIONS

This application is the U.S. National Stage of PCT/EP2021/064493, filed May 31, 2021, which in turn claims priority to European patent application number 20179209.0 filed Jun. 10, 2020. The content of these applications are incorporated herein by reference in their entireties.

The invention relates to a method for producing a laminated pane comprising a functional element with electrically switchable optical properties, a laminated pane obtainable by such a method, and use thereof.

Glazings with electrically switchable optical properties are known. Such glazings contain a functional element that typically contains an active layer between two surface electrodes. The optical properties of the active layer can be changed by a voltage applied to the surface electrodes. The switchable functional elements used in particular in the automotive sector include liquid-crystal-based functional elements, also known as liquid crystal elements. The liquid crystal elements include, for example, PDLC elements (polymer dispersed liquid crystal), whose active layer comprises liquid crystals embedded in a polymer matrix. PDLC functional elements are known, for example, from DE 102008026339 A1. Liquid crystal cells constructed as so-called guest-host cells that contain a dichroic dye are another group of liquid crystal elements. The liquid crystals are the medium (host), in which the dye (guest) is embedded, wherein the dye adapts in terms of its spatial orientation to the preferred direction of the liquid crystals. The liquid crystal mixture with dichroic dye is introduced between two carrier films, comprising in each case a conductive layer as a surface electrode and an orientation layer. The orientation layer determines the preferred direction of the liquid crystals in the current-free state. When an electrical voltage is applied on the surface electrodes, the liquid crystals change their orientation, with the dye embedded between the liquid crystal molecules making the same change in its orientation. The optical properties of the liquid crystal cell with embedded dye are thus variable as a function of the electrical field applied such that the cell can be switched between a transparent state of low turbidity and low tint and an opaque state of low turbidity and high tint. Such guest-host cells comprising a liquid mixture with dichroic dye are known, for example, from WO 2014/126974 A1. Glazings with such functional elements can thus be conveniently darkened electrically.

Reliable edge sealing of the cell is required for fail-safe use of guest-host liquid crystal cells. This prevents the liquid crystal material from being able to escape from the side of the cell. The thickness of the cell is defined by spherical spacers that are distributed over the entire area of the cell. A typical cell thickness is, for example, 10 μm. Even when reliable edge sealing of the cell itself has been carried out and the uniform cell thickness has been set, the liquid crystal cell is subject to external forces, at least during processing. For example, local pressure on a small cell region results in the liquid crystal material flowing away from that location. Due to the lower cell thickness occurring at this point, local reorientation of the liquid crystals occurs, with a color change initially occurring in the region of lower cell thickness, resulting in an inhomogeneous appearance. If the force acting locally on the liquid crystal cell is comparatively small, reorientation of the liquid crystals occurs and the liquid crystal element regains its homogeneous appearance after a short time.

The liquid crystal elements described comprising a guest-host liquid crystal cell between two carrier films are commercially available and enable production of an electrically switchable glazing. Typically, the liquid crystal element is laminated between two glass panes using conventional methods, wherein a laminated pane with electrically switchable optical properties is produced. Deformation of the guest-host liquid crystal cell also occurs during the lamination process, with the hydrostatic pressure change occurring in the autoclave process having a global effect on the cell and thus being classified as noncritical in terms of local deformations and associated optical inhomogeneities. In addition to the pressure changes resulting from the use of the autoclave process itself, the pressures acting on the liquid crystal element from the other plies of the stack of layers must also be taken into account. In particular, in the case of curved glazings, different bending of the outer and inner pane can occur, which cannot be completely avoided even by bending the panes congruently together. In addition, there are thickness fluctuations of the commonly used thermoplastic laminating films. Local thickness increases of the panes and the laminating films are transferred to the liquid crystal cell during the lamination process, resulting in local pressure, which is associated with the optical inhomogeneity described. The local pressure points lead to deformation of the liquid crystal cell.

The problems described, which result as soon as no congruent surfaces are provided at the interface of the functional elements and the thermoplastic intermediate layer, exist not only with guest-host liquid crystal cells, but can also occur with other functional elements with electrically switchable optical properties. The extent of the quality degradation that occurs depends, among other things, on the design of the functional element.

EP 0825478 A1 describes a laminated pane that includes a functional element with electrically controllable optical properties, wherein the functional element contains liquid crystal domains with dichroic dye.

EP 0964288 A2 discloses a glazing including a functional element with electrically controllable optical properties that includes liquid crystals and dichroic dyes the purpose of which is to reduce the degradation of the dichroic dyes by photoreduction.

One possible approach to improving the optical quality of laminated panes with functional elements is the use of resins that can be used to laminate the functional element. For example, UV-curing acrylic resins are known by the term OCA (optically clear adhesive). These are provided in film form between two transfer films, with the transfer films being used only to apply the OCA to a pane or other substrate. Although these resinous films can provide some optical improvement, a complete solution of the problems described is not possible under all circumstances. Moreover, it is desirable not only to achieve optical improvement using resinous films but also to be able to use these and other common laminating films.

The object of the present invention is to provide a method for producing a laminated pane comprising a functional element with electrically switchable optical properties, in which local exertion of pressure on the functional element is avoided, as well as a laminated pane including such a functional element. The laminated pane should include a functional element having the most homogeneous thickness possible that has good optical quality without visible inhomogeneities.

The object of the present invention is accomplished according to the invention by a method for producing a laminated pane with a functional element, a laminated pane produced by such a method, and use thereof according to the independent claims 1, 14, and 15. Preferred embodiments of the invention emerge from the dependent claims.

The method for producing a laminated pane with a functional element comprises, as essential steps, the formation of a first stack of layers of panes and thermoplastic laminating films, which contains a reversibly detachable separating film, the removal of the separating film, and, subsequently, the lamination of the laminated pane with the functional element, with the functional element placed at the location of the removed separating film. The thermoplastic laminating films surrounding the functional element are pre-formed in this manner before accommodating the functional element. The required steps are described in detail in the following. In a first step of the method according to the invention, a first stack of layers is created from, in this order, at least a first pane, a first thermoplastic laminating film, at least a separating film, a second thermoplastic laminating film, and a second pane. In a first lamination step, the first stack of layers produced in this way is laminated while being heated. The first lamination step does not yet serve for the final production of a laminated pane, but only for the formation of two homogeneous surfaces in the stack of layers that will accommodate the functional element in the subsequent laminated pane. Not until a second lamination step is the functional element inserted and the stack of layers laminated to form a laminated pane. In the first lamination step, the first thermoplastic laminating film and the second thermoplastic laminating film melt at least partially, as a result of which they adhere to the respective adjacent pane. The melting of the laminating films causes thermoplastic flowing of the material of the laminating films, by which means unevenness and manufacturing tolerances of the laminating films and the panes are compensated for by migration of the melt. During the lamination of the first stack of layers, the first thermoplastic laminating film and the second thermoplastic laminating film are separated from one another by the at least one separating film such that a fusing of the first thermoplastic laminating film with the second thermoplastic laminating film is prevented. The separating film is a material in film form that does not melt in the lamination process that can be detached from the first thermoplastic laminating film and the second thermoplastic laminating film without leaving any residue and has only slight adhesion to them. By using the at least one separating film, the first pane with the first thermoplastic laminating film can be easily removed from the second pane with the second thermoplastic laminating film in a subsequent step. When the first pane with the associated laminating film is removed, the at least one separating film remains on one of the surfaces of the laminating films facing one another in the stack of layers and can then be peeled off of this laminating film. Due to the low adhesion of the separating film to the thermoplastic laminating films, these components exhibit only low adhesion to one another, making residue-free detachment possible. In this way, the separating film is removed from the stack of layers. What remains are the first pane with the first thermoplastic laminating film laminated thereon and the second pane with the second thermoplastic laminating film laminated thereon. In the subsequent sequence of steps, the actual laminated pane with the functional element laminated therein is produced. First, a functional element is provided. This functional element is placed on the first thermoplastic laminating film of the first pane or the second thermoplastic laminating film of the second pane and covered with the second thermoplastic laminating film with the second pane or with the first thermoplastic laminating film with the first pane. The two thermoplastic laminating films surround the functional element, with a second stack of layers being formed from, in this order, at least the first pane, the first thermoplastic laminating film, the functional element, the second thermoplastic laminating film, and the second pane. The second stack of layers is finally laminated to form a laminating film.

In the laminated pane produced by means of the method according to the invention, local pressure points of the functional element are avoided, as result of which the functional element has a homogeneous thickness that results in good optical quality without visible inhomogeneities. In the first lamination step of the method, in which the components of the laminated pane are laminated without a functional element and with a separating film placed at the position of the functional element, the thermoplastic laminating films already begin to flow and thus form a uniform surface. The thermoplastic laminating films themselves sometimes have considerable manufacturing tolerances in their thickness. This also applies to a lesser extent to the panes used, with tolerances occurring in particular when using three-dimensionally curved panes. Local thickness deviations are compensated for in the first lamination step of the method according to the invention such that the greatest possible plane parallelism can be achieved at the location of the functional element. The material of the thermoplastic laminating film flows out of regions of the pane with excessive layer thickness of the thermoplastic laminating film and/or of the adjacent pane to regions of the pane in which the thickness of the layers is too low. The manufacturing tolerances of the panes and the laminating films are thus compensated, and the surfaces of the laminating films used to accommodate the functional element after removal of the separating film have a high degree of plane parallelism without undesirable local elevations or depressions. Local pressure points on the functional element are thus avoided. Without such a first lamination step, a local increase in thickness of a pane would, for example, press through onto the functional element. As a result, at this point, material of the active layer of the functional element is pressed away and an optically visible inhomogeneity results. Although the material of the thermoplastic laminating films can also flow in the second lamination step, the manufacturing tolerances are not compensated quickly enough to result in corresponding damage to the liquid crystal element. This is avoided by means of the method according to the invention.

A wide variety of materials in film form can be used as the separating film, provided they do not melt at the temperatures customarily used in lamination processes, in particular autoclave processes, and adhere only slightly to the adjacent thermoplastic laminating films. Preferably, the separating films made of chemically inert materials with a melting temperature above 150° C. are used. Particularly preferably, the separating films comprise polyhaloolefins, in particular polytetrafluoroethylene. Polyhaloolefins and in particular polytetrafluoroethylene are advantageous in terms of their good chemical and mechanical stability and good residue-free detachability from the preferred materials of the thermoplastic laminating films.

In a preferred embodiment of the method according to the invention, at least two separating films, preferably exactly two separating films, are used. This results in a first stack of layers consisting of, in this order, at least a first pane, a first thermoplastic laminating film, a first separating film, a second separating film, a second thermoplastic laminating film, and a second pane, which is joined in a first lamination step. The use of two separating films is advantageous in terms of the simplified detachment of the separating films. When only a single separating film is used in the first stack of layers, the two opposite film surfaces of this separating film are, in each case, in direct contact with and interact with a laminating film. Even in the case of separating films that have low adhesion to the thermoplastic laminating films, this can be a hindrance at the time of separation of the first stack of layers with only one separating film, reducing the ability to automate the process. Using two separating films results in improved separation of the first stack of layers. Even if the separating films have low adhesion to the respective adjacent thermoplastic laminating film, this is in any case greater than the adhesion of the two separating films to one another. Thus, when the first pane with the first thermoplastic laminating film is lifted off, the first separating film remains on the first thermoplastic laminating film; while the second separating film continues to lie on the second thermoplastic laminating film. The first separating film and the second separating film can then be peeled off the laminating films with simple means, with even slight adhesion of the separating film to the laminating films not causing any significant disruption of the production process.

In a preferred embodiment of the method according to the invention, the first and/or the second separating film, preferably both separating films, protrude, in at least one edge section, preferably substantially circumferentially, beyond the circumferential common edge of the panes. As a result, the separating film or the separating films can be picked up by machine or by hand in the areas protruding beyond the pane edges in order to initiate the separation of the first stack of layers. Thus, the separation of the first stack of layers is facilitated.

The functional element with electrically controllable optical properties typically comprises an active layer between two surface electrodes. The active layer has the controllable optical properties that can be controlled by the voltage applied to the surface electrodes. The surface electrodes and the active layer are typically arranged substantially parallel to the surfaces of the first pane and the second pane. The surface electrodes are electrically connected to an external voltage source in a manner known per se. The electrical contacting is implemented by suitable connection cables, for example, foil conductors, such as so-called FPC connections, which are optionally connected to the surface electrodes via so-called "bus bars", for example, strips of an electrically conductive material or electrically conductive imprints.

In a particularly preferred embodiment, the functional element is a liquid crystal element and comprises a guest-host liquid crystal cell with dichroic dye as an active layer. The method according to the invention is particularly suitable for incorporating such functional elements.

In other possible embodiments, the active layer is a PDLC, an SPD, an electrochromic, or an electroluminescent layer.

In a possible embodiment, the functional element is a PDLC functional element (polymer dispersed liquid crystal). The active layer of a PDLC functional element contains liquid crystals that are embedded in a polymer matrix. When no voltage is applied to the surface electrodes, the liquid crystals are aligned in a disorderly manner, resulting in strong scattering of the light passing through the active layer. When a voltage is applied to the surface electrodes, the liquid crystals align themselves in a common direction and the transmittance of light through the active layer is increased. Such a functional element is known, for example, from DE 102008026339 A1.

An SPD (suspended particle device) functional element contains an active layer comprising suspended particles, with the absorption of light by the active layer being variable by application of a voltage to the surface electrodes. The change in absorption is based on the alignment of the rod-shaped particles in the electric field when electric voltage is applied. SPD functional elements are known, for example, from EP 0876608 B1 and WO 2011033313 A1.

In an electrochromic functional element, the active layer of the functional element is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, which causes a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In electroluminescent functional elements, the active layer contains electroluminescent materials, in particular organic electroluminescent materials whose luminescence is stimulated by the application of a voltage. Electroluminescent functional elements are known, for example, from US 2004227462 A1 and WO 2010112789 A2. The electroluminescent functional element can be used as a simple light source or as a display with which any presentations can be shown.

Due to their thermoplastic properties, the first thermoplastic laminating film and a second thermoplastic laminating film are suitable for forming an adhesive bond to one another and to the adjacent panes and/or adjacent functional elements. During the lamination process, the thermoplastic films begin to flow under the action of heat, causing them to adhere to adjacent elements and to be connected both to them and to the inserted liquid crystal element. Preferably, the first and the second thermoplastic film contain polyvinyl butyral (PVB), ethylene vinyl acetate (EVA), polyurethane (PU), cycloolefin polymers (COP) and/or copolymers or mixtures thereof, particularly preferably PVB. These materials are common for the thermoplastic intermediate layer of laminated panes and create an adhesive bond to glass. This ensures a good bond. The term "laminating film" refers generally to a single- or multi-ply polymeric film that bonds the panes of the laminated pane to one another surface-to-surface, with this bonding function giving the film its name. Laminated panes usually comprise two panes, with a bond of these panes created only by the laminating film placed between the two panes and its adhesion in the lamination process.

In a preferred embodiment of the method according to the invention, the first thermoplastic laminating film and/or the second thermoplastic laminating film, preferably both thermoplastic laminating films, contain in each case at least one plasticizer.

Plasticizers are chemical compounds that make plastics softer, more flexible, smoother, and/or more elastic. They shift the thermoelastic range of plastics to lower temperatures such that the plastics have the desired more elastic properties in the range of the temperature of use. Preferred plasticizers are carboxylic acid esters, in particular low-volatility carboxylic acid esters, fats, oils, soft resins, and camphor. Other plasticizers are preferably aliphatic diesters of tri- or tetraethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethyl hexanoate), in other words, a compound of the formula $C_4H_9CH(CH_2CH_3)CO(OCH_2CH_2)_3O_2CCH(CH_2CH_3)C_4H_9$.

Preferably, the first thermoplastic laminating film and/or the second thermoplastic laminating film, preferably both films, contain at least 25 wt.-%, preferably at least 30 wt.-%, and in particular at least 40 wt.-% of a plasticizer. The plasticizer contains or is made of triethylene glycol-bis-(2-ethyl hexanoate). Polyvinyl butyral films marketed under the name "High Flow PVB", which have a higher plasticizer content compared to conventional thermoplastic laminating films, for example, have proved to be well suited for the method according to the invention. The higher plasticizer content results in improved flowability of the material during melting in the lamination process. Moreover, the material of the laminating films, which becomes softer with increasing plasticizer content, can also adapt better to the surfaces and contours of the panes and of the functional element in the second lamination step.

The first thermoplastic laminating film and/or the second thermoplastic laminating film can in each case be formed by one or a plurality of polymeric films. The thermoplastic laminating films can in each case also comprise a plurality of polymeric layers with different or the same properties. The laminated pane can contain a first thermoplastic laminating film and a second thermoplastic laminating film or even multiple first and/or second thermoplastic laminating films. Accordingly, instead of a first and/or second thermoplastic laminating film, there may also be a respective two-ply, three-ply, or multi-ply film stack composed of thermoplastic laminating films and/or further functional films, with the individual films having the same or different properties. A thermoplastic laminating film can also be formed from sections of different thermoplastic films whose side edges are adjacent each other.

In a preferred embodiment, the first thermoplastic laminating film and/or the second thermoplastic laminating film can in each case include at least two outer polymeric layers and at least one inner polymeric layer positioned therebetween, wherein the inner polymeric layer has greater plasticity or elasticity than the outer polymeric layers. Such layer structures are also used as an acoustically damping thermoplastic intermediate layer of laminated panes. Acoustically damping thermoplastic intermediate layers have a soft core, with the stiffness of the layer structure increasing from the core of the inner polymeric layer to the surfaces of the outer polymeric layers facing away from the inner polymeric layer. The inner polymeric layer has a thickness of 0.05 mm to 0.40 mm, and the outer polymeric layers have a thickness of 0.20 mm to 0.60 mm, with the total thickness of the acoustically damping intermediate layer being at least 0.50 mm, preferably at least 0.70 mm.

The inner polymeric layer with higher elasticity is primarily responsible for the acoustic damping, while the outer polymeric layers of lower elasticity contribute significantly to the stabilization of the pane. The use of such acoustically damping thermoplastic intermediate layers as a first and/or second thermoplastic laminating film is advantageous in terms of exerting pressure as homogeneously as possible on the functional element to be integrated. Due to its higher elasticity, the soft inner polymeric layer of the laminating film assumes a compensating function with regard to local increases in thickness at the surface of the pane facing the thermoplastic laminating film. Thus, local pressure points on the functional element are avoided and the optical quality of the glazing produced is increased.

The acoustic properties of an acoustically damping thermoplastic intermediate layer are preferably determined via a so-called "mechanical impedance measurement" (MIM). This is a standardized procedure described in ISO 16940, from which the damping can be calculated by measuring the natural frequencies. According to the standard, the acoustically damping intermediate layer to be investigated is laminated between two 2.1-mm-thick glass panes to enable appropriate comparability for different glass thicknesses. The person skilled in the art can thus select suitable intermediate layers on the basis of a well-known standardized measurement procedure.

The mechanical impedance measurement is carried out, at the earliest, one month after production of the laminated glass. Furthermore, the intermediate layer itself is laminated with the two 2.1-mm-thick glass panes to form a laminated glass, at the earliest, one month after its manufacture. This ensures that a stable state has developed at the time of measurement.

It has been shown that acoustically damping thermoplastic intermediate layers with certain damping factors are particularly suitable for carrying out the method according to the invention. In a preferred embodiment of the thermoplastic laminating films, these are acoustically damping thermoplastic intermediate layers, for which the following applies: the damping factor $\eta_1$ of the first mode and the damping factor $\eta_2$ of the second mode of a laminated glass pane with a surface area of 25 mm×300 mm consisting of two glass panes with a thickness of 2.1 mm in each case, between which the acoustically damping intermediate layer is laminated is $\eta_1 \geq 0.20$ and $\eta_2 \geq 0.25$, preferably $\eta_1 \geq 0.25$ and $\eta_2 \geq 0.30$, particularly preferably $\eta_1 \geq 0.25$ and $\eta_2 \geq 0.35$, in a mechanical impedance measurement (MIM) per ISO 16940 at a temperature of 20° C.

The outer polymeric layers and the inner polymeric layer contain at least polyvinyl butyral (PVB), ethylene vinyl acetate (EVA), polyurethane (PU) or mixtures or copolymers or derivatives thereof, which have proven themselves for laminated glasses.

In a preferred embodiment, the outer polymeric layers and the inner polymeric layer contain polyvinyl butyral and plasticizer. The selection of the plasticizer and the degree of acetylization of the polyvinyl butyral make it possible to influence the elasticity of the polymeric layers in a manner known to the person skilled in the art.

The inner polymeric layer preferably has a thickness of 0.07 mm to 0.30 mm, particularly preferably of 0.10 mm to 0.20 mm, most particularly preferably of about 0.15 mm, while the outer polymeric layers have a thickness of 0.30 mm to 0.40 mm, particularly preferably of about 0.35 mm. In a preferred embodiment of the invention, the outer polymeric layers have the same thickness. Alternatively, the outer polymeric layers can also differ from one another in their thickness.

In a possible embodiment of the invention, in step e) a thermoplastic frame film that surrounds the functional element is arranged between the first thermoplastic laminating film and the second thermoplastic laminating film. In the region of the pane beyond the side edges of the functional element, the thermoplastic frame film is accordingly placed circumferentially into the stack of layers. The frame film is implemented like a frame with a cutout into which the functional element is inserted. The frame film can correspond in its nature and material composition to the first and/or second thermoplastic laminating film, with the cutout having been introduced by cutting. Alternatively, the thermoplastic frame film can also be composed of a plurality of film sections around the functional element. The outer side edges of the thermoplastic frame film are preferably arranged congruent to the side edges of the first and the second thermoplastic laminating film. The thermoplastic frame film can differ in its thickness from the thickness of the first and/or second laminating film. Preferably, the thickness of the thermoplastic frame film is selected such that it has roughly the same thickness as the functional element. This compensates for the local difference in thickness of the laminated pane, which is introduced by the locally limited functional element, such that glass breakage during lamination can be avoided.

The frame film is in contact with the adjacent thermoplastic laminating films and fuses with the thermoplastic laminating films during the lamination process. The individual film components are nevertheless retained to the extent that they are detectable even in the laminated pane after lamination.

In another preferred embodiment, the material composition of the frame film differs from the composition of the first and second thermoplastic laminating film. In particular, the frame film can include PET, for example, be made of PET. This is advantageous in order to match the consistency of the frame film to the consistency of the functional element.

The thickness of the thermoplastic laminating film is essentially determined by the thickness of the functional element, with both thicknesses particularly preferably being exactly identical. In practice, this is often not possible due to standardized film thicknesses of the thermoplastic laminating films. In this case, the thickness of the thermoplastic frame film is selected to be greater than the thickness of the functional element, since otherwise undesirable pressure would be exerted on the functional element. Thus, the thickness of the thermoplastic frame film is preferably greater than or equal to the thickness of the functional element. This is particularly advantageous when the functional element is implemented as a guest-host liquid crystal cell.

In another preferred embodiment of the method according to the invention, no thermoplastic frame film is inserted into the stack of layers. This is possible, for example, when the functional element has a comparatively low thickness and the local difference in thickness is thus small. Whether a frame film can be dispensed with depends both on the design of the functional element and on the geometry of the laminated pane to be produced. PDLC elements or SPD elements, for example, are suitable for use without a frame film. Other functional elements are also suitable for lamination without a frame film under certain conditions. In particular, in the case of complex geometries or strong bends in the edge region, even a small local difference in thickness can promote glass breakage. It is therefore not possible to make a general prediction as to the thickness difference above which a thermoplastic frame film should be used.

Elements comprising a guest-host liquid crystal cell with dichroic dye are preferably used as the functional element in the method according to the invention. The liquid crystal element comprises two carrier films, which are arranged at a preferably constant distance from one another and are sealed along their common circumferential edge via a sealant. The guest-host liquid crystal cell is formed between the carrier films. On each of the carrier films, an electrically conductive layer is in each case arranged on the surface of the carrier film facing the liquid crystal cell. The electrically conductive layers serve as surface electrodes via which electrical contact is made with the liquid crystal cell. Applying an electrical voltage on the surface electrodes causes alignment of the liquid crystals in the electrical field. The guest-host liquid crystal cell comprises liquid crystals as the underlying medium (host), in which a dichroic dye is embedded. The embedded dichroic dyes align themselves along the preferred direction of the liquid crystals. Due to their dichroism, the embedded dye molecules absorb incident light depending on their orientation. Light with a polarization direction parallel to the absorption axis is strongly absorbed, while light with a polarization direction perpendicular to the absorption axis is only weakly absorbed. The light transmittance of a guest-host liquid crystal cell depends on the orientation of the dye molecules, which is, in turn, determined by the preferred direction of the liquid crystals, which align themselves in the electrical field when a voltage is applied. As a result, depending on whether a voltage is applied to the surface electrodes, the liquid crystal element can be switched between an opaque state and a transparent state. Other factors affecting the transmittance of the liquid crystal element are the absorption coefficient of the embedded dye, the thickness of the cell, and the dye concentration. The transparent state and the opaque state differ in that transmittance in the opaque state is less than in the transparent state, with a certain transmittance present and desirable even in the opaque state. The person skilled in the art can adjust this as desired as a function of the variables mentioned. The operating voltage of the guest-host liquid crystal cells depends on the cell thickness and the dye concentration.

Guest-host liquid crystal cells as well as the liquid crystals and dyes usable therein are commercially available and are known to the person skilled in the art. For example, nematic liquid crystals and dichroic dyes, preferably anthraquinone dyes and/or azo dyes can be used. The orientation of the liquid crystals present in the de-energized state is determined by an orientation layer present on the electrically conductive layers immediately adjacent the liquid crystals. Brushed polyimide, for example, is used as the orientation layer.

In addition to the active layer and the electrically conductive layers, the functional element can have other layers known per se, for example, barrier layers, blocking layers, antireflection layers, protective layers, and/or smoothing layers.

The distance between the carrier films defines the cell thickness, which is preferably approx. 5 µm to approx. 20 µm and particularly preferably approx. 8 µm to approx. 12 µm. To maintain the cell gap, spacers can be provided within the volume of the active layer. These are inserted between the carrier films, for example, in the form of rods and/or beads made of glass or plastic. The sealant for sealing the edge region of the active layer is arranged in the gap between the carrier films adjacent the circumferential edge. A two-component epoxy resin, for example, is used as the sealant.

Preferably, the first carrier film and/or the second carrier film contain at least one polymer that does not melt completely in the autoclave process, preferably polyethylene terephthalate (PET). Particularly preferably, the first and the second carrier film are made of a PET film. The carrier films are preferably transparent. The thickness of the carrier films is preferably from 0.025 mm to 0.400 mm, in particular from 0.050 mm to 0.200 mm. The electrically conductive layers according to the invention are preferably arranged on one surface of the carrier film, that is, on exactly one of the two sides of the carrier film (i.e., on its front side or its back side). The carrier films are oriented in the liquid crystal element such that the electrically conductive layers are arranged adjacent the active liquid crystal cell and function as its surface electrodes.

The electrically conductive layers of the carrier films serve as surface electrodes of the functional element and are preferably transparent. The surface electrodes preferably contain at least a metal, a metal alloy, or a transparent conductive oxide (TCO). The surface electrodes can contain, for example, silver, gold, copper, nickel, chromium, tungsten, indium tin oxide (ITO), gallium-doped or aluminum-doped zinc oxide and/or fluorine-doped or antimony-doped tin oxide. The surface electrodes preferably have a thickness of 10 nm to 2 µm, particularly preferably of 20 nm to 1 µm, most particularly preferably of 30 nm to 500 nm.

In the laminated pane to be produced, the surface electrodes and the active layer are typically arranged substantially parallel to the surfaces of the first pane and of the second pane. The surface electrodes are connected to an external voltage source in a manner known per se. The electrical contacting is realized by suitable connection cables, for example, foil conductors, which are optionally connected to the surface electrodes via so-called bus bars, for example, strips of an electrically conductive material or electrically conductive imprints.

The first and the second electrically conductive layer are deposited on the carrier films before step a) by methods known per se. By way of example, reference should be made to magnetron-enhanced cathodic sputtering. This is particularly advantageous in terms of a simple, fast, economical, and uniform coating of the substrate. However, the electrically conductive layers can also be applied, for example, by vapor deposition, chemical vapor deposition (CVD), plasma enhanced chemical vapor deposition (PECVD), or by wet chemical processes.

The electrical contacting of the electrically conductive layers via bus bars or other suitable electrical conductors is carried out prior to lamination of the laminated pane, preferably prior to sealing the edge region with the sealant during production of the functional element.

Any prints present, for example, opaque masking prints or printed bus bars for the electrical contacting of the functional element are preferably applied by screen printing.

Optionally, the functional element can be divided into various segments switchable independently of one another. For this, the electrically conductive layers, which serve as surface electrodes of the liquid crystal cell, are divided into different segments by means of separating lines, which segments can be individually controlled via bus bars attached in each case in the region of the segments. The separating lines electrically isolate adjacent segments from one another. In the region of the separating lines, the electrically conductive layers of the carrier films are removed, resulting in the electrically isolating effect of the separating lines. The de-coating of individual separating lines in the electrically conductive layer is preferably done by a laser beam. The separating lines can be generated at any point in the method. The separating lines are preferably generated by means of a laser through the carrier film nearest the electrically conductive layer to be processed. The wavelength of the laser radiation of the laser with which the separating lines are introduced into the electrically conductive layer is suitably selected such that the electrically conductive layer has sufficiently high absorption of the laser radiation and that the carrier film has sufficiently low absorption of laser radiation. Thus, the separating line is advantageously introduced selectively into the electrically conductive layer without the carrier film being damaged. It must be taken into account that due to the focusing of the laser radiation, the power density in the electrically conductive layer is significantly greater than in the carrier layer.

When generating the separating lines, it has proven advantageous to select the wavelength of the radiation of the laser in the range from 150 nm to 1200 nm, preferably in the range from 200 nm to 500 nm, particularly preferably in the range from 250 nm to 400 nm. It has been demonstrated that this range is particularly suitable for the wavelengths when using conventional electrically conductive layers and conventional carrier films. The wavelength range of the laser is selected such that the separating lines are selectively introduced into the electrically conductive layers. The width of the de-coating is preferably 10 µm to 1000 µm, particularly preferably 30 µm to 200 µm, and in particular 70 µm to 140 µm. In this range, particularly clean and residue-free de-coating by the laser beam takes place.

The lamination of the first stack of layers in step b) and the second stack of layers in step f) is preferably carried out under the action of heat, vacuum, and/or pressure. Methods for lamination known per se can be used, for example, autoclave methods, vacuum bag methods, vacuum ring methods, calendar methods, vacuum laminators, or combinations thereof.

Preferably, lamination in step b) and/or f) is carried out in the autoclave process, particularly preferably at an elevated pressure of about 10 bar to 15 bar and temperatures of 130° C. to 145° C. for a period of about 2 hours. In another embodiment, vacuum bag or vacuum ring methods known per se are used in step b) and/or f), operating, for example, at about 200 mbar and 80° C. to 110° C. Alternatively, vacuum laminators can be used. These consist of one or more heatable and evacuable chambers, in which the first pane and the second pane are laminated within, for example, about 60 minutes at reduced pressures from 0.01 mbar to 800 mbar and temperatures from 80° C. to 170° C.

Methods for producing the functional elements used in the method according to the invention are known to the person skilled in the art and are sufficiently described in the literature.

If the functional element is a guest-host liquid crystal element, the carrier films are generally held together to form a predetermined gap by using an epoxy-based edge sealant at the circumferential edge, with the spacing of the carrier films determining the thickness of the liquid crystal cell and defined by circumferentially inserted spacers. The liquid crystal is, for example, introduced into the gap using a vacuum filling process or a drop filling process. In the case of the vacuum filling process, the circumferential edge sealing is not continuous and has an opening, referred to as a "fill hole". The carrier films with edge sealing are then arranged in a vacuum chamber, wherein the air between the carrier films is removed. Liquid crystal material is introduced into this evacuated gap between the carrier films and is sucked into the gap due to capillary forces. This can be accelerated by bringing the assembly to atmospheric pressure after introducing the liquid crystal into the fill hole. The fill hole is finally sealed.

The spacers usually inserted between the carrier films in guest-host liquid crystal elements define the distance between the carrier films and, thus, the gap between them as well as the thickness of the liquid crystal cell. The spacers preferably have a thickness of 5 µm to 50 µm, particularly preferably 5 µm to 20 µm, as a result of which a corresponding gap is set between the carrier films. The gap between the carrier films should be substantially constant, with deviations of up to 20% of the thickness being tolerated.

The invention further relates to a laminated pane produced using the method according to the invention. The laminated pane contains at least a first pane, a first thermoplastic laminating film, a liquid crystal element comprising a guest-host liquid crystal cell with dichroic dye, a second thermoplastic laminating film, and a second pane. The first thermoplastic laminating film and/or the second thermoplastic laminating film have in each case at least two outer polymeric layers and an inner polymeric layer positioned therebetween, wherein the outer polymeric layers have lower elasticity or plasticity than the inner polymeric layer. This is advantageous in terms of the most homogeneous exertion of pressure on the liquid crystal element to be integrated. Due to its higher elasticity, the soft inner polymeric layer of the laminating film assumes a compensating function with regard to local thickness increases on the surface of the pane facing the thermoplastic laminating film. As a result, local pressure points on the liquid crystal element are avoided and the optical quality of the glazing produced increases. The higher elasticity or plasticity of the inner polymeric layer of the respective first and/or second thermoplastic laminating film has proven to be particularly advantageous in particular in the case of the guest-host liquid crystal cells highly sensitive to pressure points to compensate for any remaining inhomogeneities of the pane surfaces.

The features of the laminated pane explained in the description of the method according to the invention also apply to laminated panes according to the invention and are not repeated here.

The liquid crystal element is bonded to the first pane via a region of the first thermoplastic laminating film and to the second pane via a region of the second thermoplastic laminating film. The first and the second thermoplastic laminating film are preferably arranged one atop another in a planar manner and laminated to one another, with the liquid crystal element inserted between the two layers. The regions of the thermoplastic laminating films overlapping the liquid crystal element then form the regions that bond the liquid crystal elements to the panes. In other regions of the pane, where the thermoplastic laminating films are in direct contact with each other, they can fuse during lamination.

The first and the second pane of the laminated pane can be bent, for example, in the case of use as vehicle glazing. The panes can be bent individually or together. Preferably, the panes are bent congruently together (i.e., at the same time and by the same tool), since, thus, the shape of the panes is optimally matched for the subsequently occurring lamination.

If the laminated pane is intended to function as a curved vehicle glazing, at least the pane used as the outer pane is subjected to a bending process prior to lamination. In a preferred embodiment, the pane used as the inner pane is also subjected to a bending process. This is, in particular, advantageous in the case of strong curves in multiple spatial directions (so-called "three-dimensional bending").

Alternatively, the pane used as the inner pane is not pre-bent. This is especially possible in the case of panes with very low thicknesses since these have film-like flexibility and thus can be adapted to the pre-bent outer pane without having to be pre-bent themselves.

The first pane and/or the second pane preferably contain glass, particularly preferably flat glass, float glass, quartz glass, borosilicate glass, soda lime glass, or clear plastics, preferably rigid, clear plastics, in particular polycarbonate, polymethyl methacrylate, and/or mixtures thereof. The first pane and/or the second pane are transparent in a possible embodiment, in particular for the use of the pane as a windshield, rear window, or rear side window of a vehicle or other uses thereof in which high light transmittance is desired. However, for panes that are not in the driver's traffic-relevant field of view, for example, for roof panels, the transmittance can also be much lower, for example, greater than 5%. In principle, any other panes can be arranged on the exterior-side surfaces of the first and second pane and bonded thereto by lamination with interposition of thermoplastic films or also by spacers in the case of an insulating glazing.

In a possible embodiment, the laminated pane according to the invention is a windshield, with the functional element being used as an electrically switchable sun visor.

In a preferred embodiment, the laminated pane according to the invention is a roof panel or a side pane.

The thickness of the first pane and/or of the second pane is between 0.3 mm and 10 mm, with the pane thickness highly dependent on the application of the pane.

Particularly in the automotive sector, there has been in recent years a trend toward increasingly lower glass thicknesses, enabling savings in terms of vehicle weight. The pane thicknesses of an automobile glazing, in particular a windshield are, for the inner pane, usually in the range from 0.3 mm to 2.5 mm and, for the outer pane, in the range from 0.8 mm to 2.5 mm. An asymmetric thickness combination, in which the thickness of the outer pane is greater than the thickness of the inner pane, is advantageous in terms of improved stability of the laminated pane, especially with a low total thickness.

If the laminated pane is a windshield, the thickness of the outer pane is preferably between 0.8 mm and 2.1 mm and the thickness of the inner pane is preferably between 0.5 mm and 1.8 mm.

If the laminated pane is a roof panel of a motor vehicle, the thickness of the outer pane is preferably between 1.1 mm and 2.1 mm and the thickness of the inner pane is preferably between 0.5 mm and 1.6 mm.

The laminated glass is, in its embodiment as a vehicle glazing, preferably bent in one or more spatial directions, as is customary for motor vehicle panes, with typical radii of curvature in the range from approx. 10 cm to approx. 40 cm. The laminated glass can, however, also be flat, for example, when it is intended as a pane for buses, trains, tractors, or as building glazing.

The first pane and/or the second pane can be thermally or chemically tempered, partially tempered, or non-tempered.

The laminated glass can also be provided with an additional function, in that the thermoplastic intermediate layer has functional inclusions, for example, inclusions with IR absorbing, UV absorbing, or coloring properties. The inclusions are, for example, organic or inorganic ions, compounds, aggregates, molecules, crystals, pigments, or dyes. In particular, thermoplastic intermediate layers with UV absorbing properties between the pane used as the outer pane and the functional element are advantageous in terms of protection of the functional element against UV radiation.

In particular with use of the laminated pane according to the invention in vehicles, it is advantageous to implement further functions in order to reduce the negative effects of weathering influences such as strong solar radiation or ice formation.

Another aspect of the invention includes the use of the laminated pane according to the invention in means of transportation for travel on land, in the air, or on water, preferably in trains, watercraft, and motor vehicles, for example, as a windshield, rear window, side window and/or roof panel, particularly preferably as a motor vehicle roof panel.

In the following, the invention is explained in detail with reference to drawings and exemplary embodiments. The drawings are schematic representations and not to scale. The drawings in no way restrict the invention.

Figure 2A:
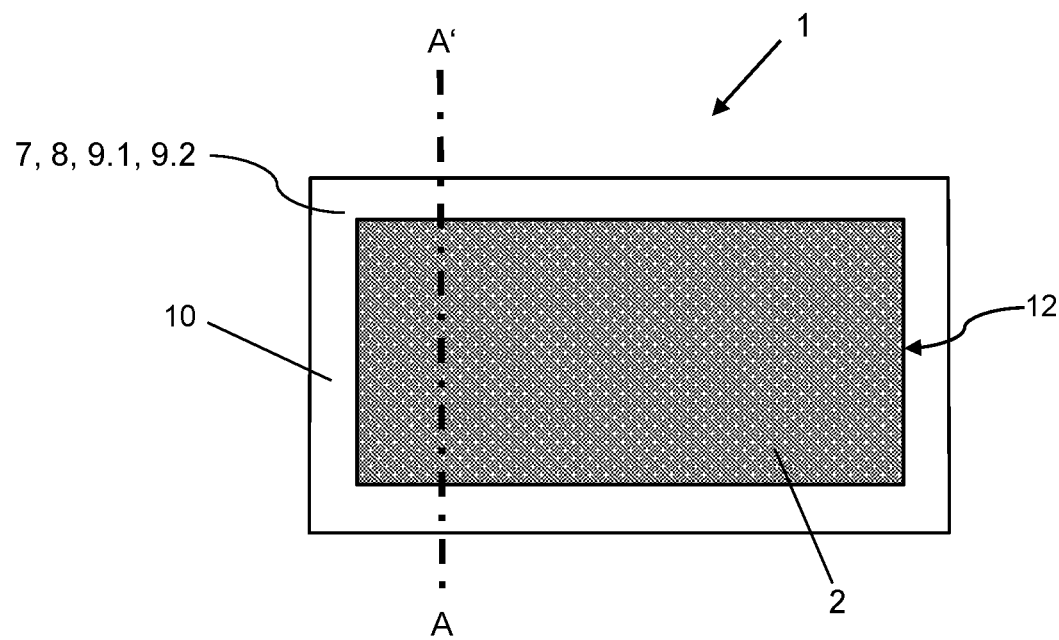
Figure 2B:
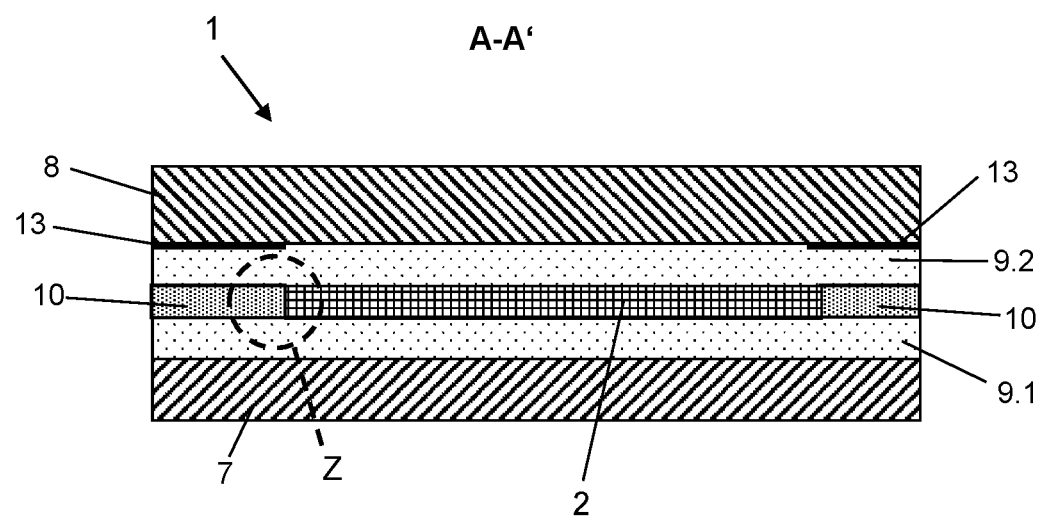
Figure 2C:
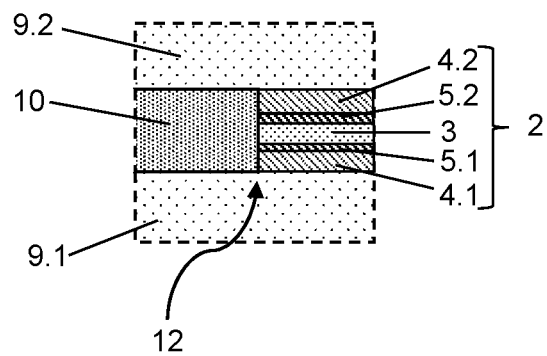
Figure 2D:
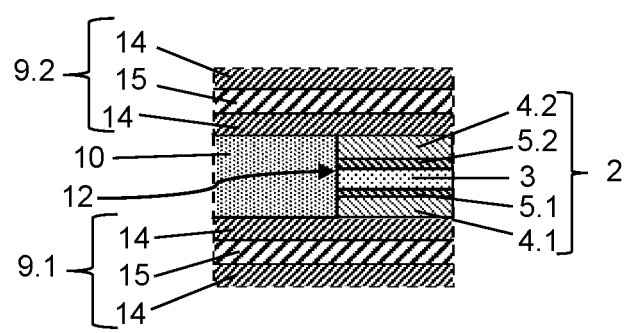
Figure 3:
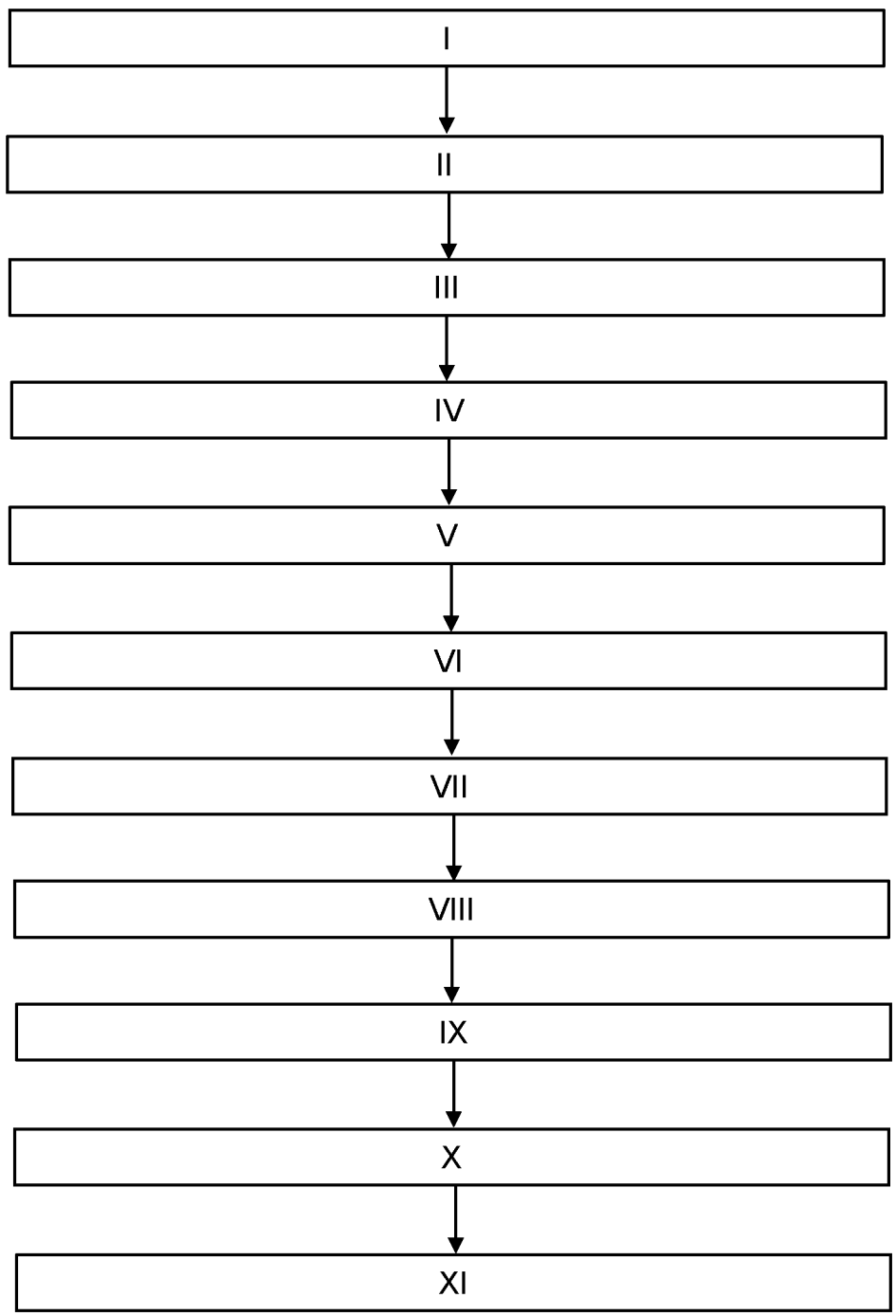

They depict:

FIG. 1 a cross-section of the stack of layers of the laminated pane during one embodiment of the method according to the invention, FIG. 2a a plan view of a laminated pane 1 according to the invention with a functional element, FIG. 2b a cross-section through the laminated pane 1 of FIG. 2a along the section line AA', FIG. 2c a detail Z of the laminated pane 1 according to the invention of FIGS. 2a and 2b, shown along the section line AA', FIG. 2d a detail Z of the laminated pane 1 according to the invention of FIGS. 2a and 2b, shown along the section line AA', FIG. 3 an embodiment of the method according to the invention.

FIG. 1 depicts the stack of layers formed during a method according to the invention consisting of the first pane 7, the second pane 8, and the thermoplastic laminating films 9.1, 9.2, and the separating films 11.1, 11.2 or the functional element 3. The individual processing states of the stack of layers are represented as states A through C. A first stack of layers consisting of, in this order, the first pane 7, the first thermoplastic laminating film 9.1, the first separating film 11.1, the second separating film 11.2, the second thermoplastic laminating film 9.2, and the second pane 8 is shown as state A) in FIG. 1. One separating film 11 is sufficient, with the use of two separating films facilitating the removal of the separating films 11. The thermoplastic laminating films 11.1 and 11.2 have a thickness of 0.38 mm in each case, while the separating films 11.1 and 11.2 are essentially made of polytetrafluoroethylene and are each 50 μm thick. The panes 7, 8 are made of glass. The first stack of layers depicted in state A) is laminated at a temperature of 145° C. and a pressure of 12 bar for a period of 2 hours. As a result, the thermoplastic laminating films 9.1, 9.2 are in each case bonded to the adjacent first pane 7 and second pane 8. The separating films 11.1 and 11.2 do not adhere to one another such that the first stack of layers can be effortlessly separated between the first separating film 11.1 and the second separating film 11.2. The separating films 11 have only very little adhesion to the adjacent thermoplastic laminating films 9 such that separation of the stack of layers is possible even with only one separating film. In the first lamination step to which the first stack of layers is subjected, the thermoplastic laminating films 9 are melted and begin to flow. The thermoplastic material of the laminating films 9 is distributed evenly between the adjacent pane and the adjacent separating film such that unevenness of the pane surface can be compensated for and a homogeneous surface of the laminating films 9.1, 9.2 is available to accommodate the functional element 2. The state B) of FIG. 1 depicts the first pane 7 with the first thermoplastic laminating film 9.1 laminated thereon as well as the second pane 8 with the second thermoplastic laminating film 9.2 laminated thereon, wherein the first separating film 11.1 and the second separating film 11.2 are removed from the stack of layers. A functional element 2 is then inserted between the first thermoplastic laminating film 9.1 and the second thermoplastic laminating film 9.2. This forms the second stack of layers, which is depicted as state C). The functional element 2 is smaller in its dimensions than the panes 7, 8 and the thermoplastic laminating films 9.1, 9.2. The circumferential edge of the functional element 2 is offset inward compared to the common circumferential edge of the panes 7, 8 and the laminating films 9. A thermoplastic frame film 10 that surrounds the functional element 2 in a frame-like manner is inserted in the edge region between the circumferential edge of the functional element 2 and the circumferential edge of the panes 7, 8. The use of a frame film 10 is optional. The frame film is made of polyethylene terephthalate (PET), with the thickness of the frame film 10 equaling the thickness of the functional element 2. The functional element 2 is a guest-host liquid crystal cell, has a thickness of 280 μm, and includes a nematic liquid crystal and a dichroic dye as the active layer 3. The second stack of layers depicted in state C) is laminated in a second lamination step using an autoclave process, resulting in a laminated pane 1 according to the invention. The parameters used in the second lamination step can be selected analogous to the parameters used in the first lamination step. However, in principle, it is sufficient to enable melting in the second lamination step.

FIGS. 2a, 2b, 2c, and 2d depict views of a laminated pane 1 according to the invention with an electrically switchable liquid crystal element as a functional element 2. FIG. 2a depicts a plan view of a laminated pane 1, which was laminated in the method according to the invention of FIG. 1. In this respect, the statements concerning FIG. 1 apply unless otherwise described here. The functional element 2 is, as described in FIG. 1, laminated between the first pane 7 and the second pane 8 by means of two thermoplastic laminating films 9.1, 9.2. The view of FIG. 2b corresponds to a cross-section of the laminated pane analogous to the cross-section along the section line AA' depicted in FIG. 2a. The first thermoplastic laminating film 9.1 is placed on the first pane 7; the thermoplastic film 9.1 is followed by the functional element 2. The functional element 2 is covered by the second thermoplastic laminating film 9.2 and the stack of layers is completed by the second pane 8. The functional element 2 can also be inserted only in some parts of the laminated pane 1. In accordance with FIG. 2a, the functional element 2 is attached only in the field of view of the laminated pane 1, with a circumferential edge region remaining that is free of functional element 2. The circumferential edge 12 of the functional element 2 is thus set back in the direction toward the center of the surface of the laminated pane 1, compared to the circumferential edge of the laminated pane 1, which is formed by the panes 7, 8. In the edge region between the circumferential edge 12 of the liquid crystal element 2 and the edge of the panes 7, 8, a thermoplastic frame film 10 is inserted, which compensates for the difference in thickness between the edge region without the liquid crystal element 2 and the region with a functional element 2. Of course, additional elements, such as further electrically switchable functional films or other functional elements can optionally be present. For the sake of simplicity, three-dimensional curvature of the laminated pane is not shown in FIGS. 2a, 2b, 2c and 2d. In particular, however, it is preferably present when the laminated pane 1 is used as vehicle glazing. The advantages of the method according to the invention in terms of the optical quality of the laminated pane 1 are evident in particular with curved laminated panes. In particular, curved panes 7, 8 have inhomogeneities with respect to their thickness, which cause local pressure points on the functional element 2. These can be avoided by the first lamination step according to the invention, in which the thermoplastic laminating films 9 without a functional element 2 are pre-laminated with separating films 11. In the edge region of the laminated pane 1, in which the thermoplastic frame film 10 is inserted, the panes 7, 8 can optionally be provided with an opaque masking print 13 (see FIG. 2*b*). This conceals the frame film 10 as well as the edge 12 of the functional element 2 such that they are not visible to the observer. Such concealments by means of black printing are familiar to the person skilled in the art. The electrical contacting and edge sealing of the liquid crystal element as the functional element 2 are not shown in the figures, but are known to the person skilled in the art from the prior art.

FIG. 2*c* depicts the enlarged section Z of FIG. 2*b*, in which the laminated pane 1 of FIG. 2*a* is depicted in cross-section. FIG. 2*c* depicts the detailed layer sequence of the functional element 2. The functional element 2 comprises a first carrier film 4.1 and a second carrier film 4.2, wherein a first electrically conductive layer 5.1 is applied to a surface of the first carrier film 4.1, while a surface of the second carrier film 4.2 has a second electrically conductive layer 5.2. Situated on the electrically conductive layers 5.1, 5.2 are passivation layers and orientation layers, which are known in the prior art (not shown). As active layer 3, a liquid crystal cell in the form of a guest-host cell consisting of liquid crystals and a dichroic dye embedded therein is situated between the electrically conductive layers 5.1, 5.2. The carrier films 4.1, 4.2 consist in each case of a PET film. The electrically conductive layers 5.1, 5.2 are layers comprising indium tin oxide. The thermoplastic laminating films 9.1, 9.2 correspond to those described in FIG. 1.

FIG. 2*d* depicts another embodiment of the laminated pane 1 in the form of the enlarged section Z of the FIG. 2*b*, in which another embodiment of the laminated pane 1 of FIG. 2*a* is depicted in cross-section. The structure is essentially the same as that described in FIG. 2*c*, wherein, in contrast thereto, the thermoplastic laminating films 9.1, 9.2 are made in each case from a multilayer acoustically damping laminating film. This multilayer acoustically damping laminating film comprises two outer polymeric layers 14, between which an inner polymeric layer 15 is arranged. The inner polymeric layer 15 has greater plasticity or elasticity than the outer polymeric layers 14. Such layer structures have proved to be particularly advantageous for use in the method according to the invention. The resulting laminated pane 1 has particularly good optical quality, with local pressure points on the functional element 2 being avoided.

FIG. 3 depicts a preferred embodiment of the method according to the invention comprising the steps:

I Placing a first thermoplastic laminating film 9.1 on a first pane 7
II Placing a first separating film 10.1 on the first thermoplastic laminating film 9.1,
III Placing a second separating film 10.2 on the first separating film 10.1,
IV Placing a second thermoplastic laminating film 9.2 on the second separating film 10.2,
V Placing a second pane 8 on the second thermoplastic laminating film 9.2,
VI Lamination of a first stack of layers created from, in this order,
  a first pane 7,
  a first thermoplastic laminating film 9.1,
  a first separating film 10.1,
  a second separating film 10.2,
  a second thermoplastic laminating film 9.2,
  a second pane 8,
while heating in the autoclave process, wherein the thermoplastic laminating films 9.1, 9.2 melt and the first thermoplastic laminating film 9.1 adheres to the first pane 7 and the second thermoplastic laminating film 9.2 adheres to the second pane 2,
VII Removing the second pane 8 with the second thermoplastic laminating film 9.2 and the second separating film 10.2 from the first pane 7 with the first thermoplastic laminating film 9.1 and the first separating film 10.1,
VIII Peeling off the first separating film 10.1 and the second separating film 10.2 from the first thermoplastic laminating film 9.1 or the second thermoplastic laminating film 9.2, respectively, and removing the separating films 10.1, 10.2 from the stack of layers,
IX Placing a functional element 2 comprising an active layer 3 on the first thermoplastic laminating film 9.1 with a first pane 7 bonded thereto,
X Placing the second thermoplastic laminating film 9.2 with a second pane 8 bonded thereto on the functional element 2,
XI Lamination of the second stack of layers consisting of
  a first pane 7,
  a first thermoplastic laminating film 9.1,
  a functional element 2,
  second thermoplastic laminating film 9.2,
  second pane 8
while heating in the autoclave processes to form a laminated pane 1 according to the invention.

LIST OF REFERENCE CHARACTERS

1 laminated pane
2 functional element with electrically switchable optical properties
3 active layer
4 carrier films of the functional element
4.1 first carrier film of the functional element
4.2 second carrier film of the functional element
5 electrically conductive layers of the functional element
5.1 first electrically conductive layer
5.2 second electrically conductive layer
7 first pane
8 second pane
9 thermoplastic laminating films
9.1 first thermoplastic laminating film
9.2 second thermoplastic laminating film
10 frame film
11 separating films
11.1 first separating film
11.2 second separating film
12 circumferential edge of the functional element 2
13 opaque masking print
14 outer polymeric layers of the thermoplastic laminating films 9
15 inner polymeric layers of the thermoplastic laminating films 9
A-A' section line
Z detail

The invention claimed is:

1. A method for producing a laminated pane with a functional element with electrically switchable optical properties, the method comprising:
   a) creating a first stack of layers from, in this order, at least
      a first pane,
      a first thermoplastic laminating film,
      at least one separating film,
      a second thermoplastic laminating film,
      a second pane,
      wherein the first thermoplastic laminating film and/or the second thermoplastic laminating film are each formable by one or a plurality of polymeric films,
   b) laminating the first stack of layers from step a) while being heated, wherein the first thermoplastic laminating film adheres to the first pane and the second thermoplastic laminating film adheres to the second pane,
   c) taking the first pane with the first thermoplastic laminating film off the second pane with the second thermoplastic laminating film and the at least one separating film is removed from the stack of layers,
   d) providing a functional element comprising an active layer,
   e) placing the functional element on the first thermoplastic laminating film of the first pane or the second thermoplastic laminating film of the second pane and covered with the second thermoplastic laminating film with the second pane or with the first thermoplastic laminating film with the first pane, whereby a second stack of layers is formed from at least
      the first pane,
      the first thermoplastic laminating film,
      the functional element,
      the second thermoplastic laminating film,
      the second pane, and
   f) laminating the second stack of layers to form a laminated pane,
   wherein the at least one separating film is detachable residue-free from the first thermoplastic laminating film and the second thermoplastic laminating film.

2. The method according to claim 1, wherein the at least one separating film comprises polyhaloolefins.

3. The method according to claim 1, wherein, in step a), a first stack of layers is created from, in this order, at least
   the first pane,
   the first thermoplastic laminating film,
   a first separating film,
   a second separating film,
   the second thermoplastic laminating film, and
   the second pane.

4. The method according to claim 1, wherein the functional element is a liquid crystal element and comprises a guest-host liquid crystal cell with dichroic dye as the active layer.

5. The method according to claim 1, wherein the first thermoplastic laminating film and/or the second thermoplastic laminating film comprises polyvinyl butyral (PVB), ethylene vinyl acetate (EVA), polyurethane (PU), cycloolefin polymers (COP) or copolymers or mixtures thereof.

6. The method according to claim 5, wherein the first thermoplastic laminating film and/or the second thermoplastic laminating film each comprises at least two outer polymeric layers and at least one inner polymeric layer positioned therebetween and the at least two outer polymeric layers have lower elasticity or plasticity than the at least one inner polymeric layer.

7. The method according to claim 6, wherein the at least one inner polymeric layer has a thickness of 0.07 mm to 0.30 mm.

8. The method according to claim 6, wherein the at least two outer polymeric layers have a thickness of 0.30 mm to 0.40 mm.

9. The method according to claim 1, wherein, in step e), a frame film is arranged between the first thermoplastic laminating film and the second thermoplastic laminating film, which frame film frames the functional element along its circumferential edge.

10. The method according to claim 1, wherein the functional element comprises at least a first carrier film and a second carrier film, between which the active layer is arranged, wherein electrically conductive layers are arranged on the surfaces of the first carrier film and the second carrier film facing the active layer.

11. The method according to claim 10, wherein the electrically conductive layers contain at least a metal, a metal alloy, or a transparent conductive oxide, and have a thickness of 10 nm to 2 µm.

12. The method according to claim 10, wherein the first carrier film and/or the second carrier film contain at least one polymer that does not melt thermoplastically during the lamination process.

13. The method according to claim 4, wherein the guest-host liquid crystal cell with dichroic dye comprises at least nematic liquid crystals and a dichroic dye.

14. A laminated pane produced in a method according to claim 1, comprising:
   the first pane,
   the first thermoplastic laminating film,
   a liquid crystal element as the functional element comprising a guest-host liquid crystal cell with dichroic dye as the active layer,
   the second thermoplastic laminating film,
   the second pane,
   wherein the first thermoplastic laminating film and/or the second thermoplastic laminating film each comprises at least two outer polymeric layers and an inner polymeric layer positioned therebetween and the at least two outer polymeric layers have lower elasticity or plasticity than the inner polymeric layer.

15. A method comprising forming a motor vehicle glazing with a laminated pane according to claim 14.

16. The method according to claim 2, wherein the at least one separating film comprises polytetrafluoroethylene.

17. The method according to claim 5, wherein the first thermoplastic laminating film and/or the second thermoplastic laminating film comprise polyvinyl butyral with a plasticizer content of at least 30 wt.-%.

18. The method according to claim 11, wherein the electrically conductive layers contain at least the transparent conductive oxide.

19. The method according to claim 12, wherein at least one polymer is polyethylene terephthalate.

20. The method according to claim 13, wherein the guest-host liquid crystal cell with dichroic dye comprises an anthraquinone dye and/or an azo dye.

* * * * *